(12) United States Patent
Grieskamp et al.

(10) Patent No.: US 7,584,463 B2
(45) Date of Patent: Sep. 1, 2009

(54) STATE AS A FIRST-CLASS CITIZEN OF AN IMPERATIVE LANGUAGE

(75) Inventors: Wolfgang Grieskamp, Redmond, WA (US); Yuri Gurevich, Redmond, WA (US); Wolfram Schulte, Bellevue, WA (US); Nikolai Tillmann, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 705 days.

(21) Appl. No.: 10/650,245

(22) Filed: Aug. 27, 2003

(65) Prior Publication Data

US 2005/0050536 A1  Mar. 3, 2005

(51) Int. Cl.
G06F 9/45 (2006.01)
G06F 9/44 (2006.01)
G06F 9/46 (2006.01)

(52) U.S. Cl. ............... 717/155; 717/116; 717/153; 719/328

(58) Field of Classification Search ......... 717/124–135, 717/114
See application file for complete search history.

(56) References Cited

U.S. PATENT DOCUMENTS

| | | | | |
|---|---|---|---|---|
| 5,220,669 A * | 6/1993 | Baum et al. | ................ | 718/108 |
| 5,937,186 A * | 8/1999 | Horiguchi et al. | ........... | 712/244 |
| 6,014,666 A * | 1/2000 | Helland et al. | ................ | 707/9 |
| 6,295,640 B1 * | 9/2001 | Eidt | ........................... | 717/101 |
| 6,463,527 B1 * | 10/2002 | Vishkin | ...................... | 712/245 |
| 6,510,448 B1 * | 1/2003 | Churchyard | ............... | 718/108 |
| 6,708,194 B1 * | 3/2004 | Korn | ........................ | 718/100 |
| 7,003,770 B1 * | 2/2006 | Pang et al. | ................. | 718/100 |
| 7,149,678 B2 | 12/2006 | Gurevich et al. | | |
| 7,194,743 B2 * | 3/2007 | Hayton et al. | .............. | 719/315 |
| 2002/0174416 A1 * | 11/2002 | Bates et al. | ................ | 717/128 |
| 2004/0148603 A1 * | 7/2004 | Baylis | ........................ | 718/100 |
| 2004/0168078 A1 * | 8/2004 | Brodley et al. | ............. | 713/200 |

OTHER PUBLICATIONS

"Global array reference allocation", Araujo et al., Apr. 2002, pp. 336-357. Online retrieved at <http://delivery.acm.org/10.1145/550000/544542/p336-araujo.pdf>.*

(Continued)

*Primary Examiner*—Tuan Q Dam
*Assistant Examiner*—Thuy Dao
(74) *Attorney, Agent, or Firm*—Klarquist Sparkman, LLP

(57) ABSTRACT

A state component saves a present state of a program or model. This state component can be invoked by the program or model itself, thereby making state a first-class citizen. As the state of the program evolves from the saved state, the saved state remains for reflection and recall, for example, for testing, verification, transaction processing, etc. Using a state reference token, the saved state of the program or model can be accessed by the program or model. For example, the program or model by utilizing a state component, can return itself to the saved state. After returning to the saved state, a second execution path can be introduced without requiring re-execution of the actions leading to the saved state. In another example, the state space of an executing model is saved in order to generate inputs required to exercise a program or model.

17 Claims, 10 Drawing Sheets

OTHER PUBLICATIONS

"Reducing stack usage in Java bytecode execution", Munsil et al., Mar. 1998, pp. 7-11. Online retrieved at <http://delivery.acm.org/10.1145/1220000/1216464/p7-munsil.pdf>.*

Wolfgang Grieskamp et al.; Generating Finite State Machines from Abstract State Machines; Technical Report; Oct. 2001; 19 pages.

Mike Barnett et al.; Scenario-oriented Modeling in AsmL and its Instrumentation for Testing; International Workshop on Scenarios and State Machines: Models, Algorithms, and Tools; May 3, 2003; 9 pages.

Guillaume Texier et al.; User Defined Objects are First Class Citizen; Third Conference on Computer-Aided Design of User Interfaces; Chapter 19; Oct. 1999; pp. 231-244.

Norman P. Graham; First-Class Data Types; Comp.compilers; dated Mar. 11, 1992/downloaded Apr. 24, 2003; 5 pages.

Ashok Samal; Imperative Programming; downloaded Apr. 24, 2003; http://csce.unl.edu/~samal/class/f02/322/handouts/1; 67 pages.

\* cited by examiner

TIME →

```
class state
    Join ( )  ←——1002
        let joinedOrigin = currentState.origin
        let b1 = currentState.bindings
1006    let b2 = me.bindings currentState.bindings :=
1004→      { ⅂ ->b1(⅂) | ⅂ in Indices(b1) - Indices(b2) } +
           { ⅂ ->b2(⅂) | ⅂ in Indices(b2) - Indices(b1) } +
1008→      { ⅂ ->Resolve(joinedOrigin, v1, t2, v2, t2)
               | ⅂ in Indices(b1) * Indices(b2),
                 (v1, t1)=b1(⅂), (v2, t2)=b2(⅂) }

Resolve (joinedOrigin as Timestamp,
1010           v1 as value, t1 as Timestamp, v2 as Value, t2 as
                 Timestamp) as (Value, Timestamp)
           if Comparable (t1, t2) then
               if Less (t1, t2) then
                   return (v2, joinedOrigin)
               else                                    ↘1012
                   return (v1, joinedOrigin)
           else
1014→          return (Compose (v1, v2), joinedOrigin)
       Compose (v1 as value, v2 as value) as Value
           // dependent on the value domain 1016→  Update (location as location, value as value)
           currentState.bindings(location) := (value, currentState.origin)
1018→  Read (location as location) as Value
           return any v | ⅂ -> (v, _) in currentState.bindings where ⅂ = location
           if none error "location" + location + "has not been initialized"
```

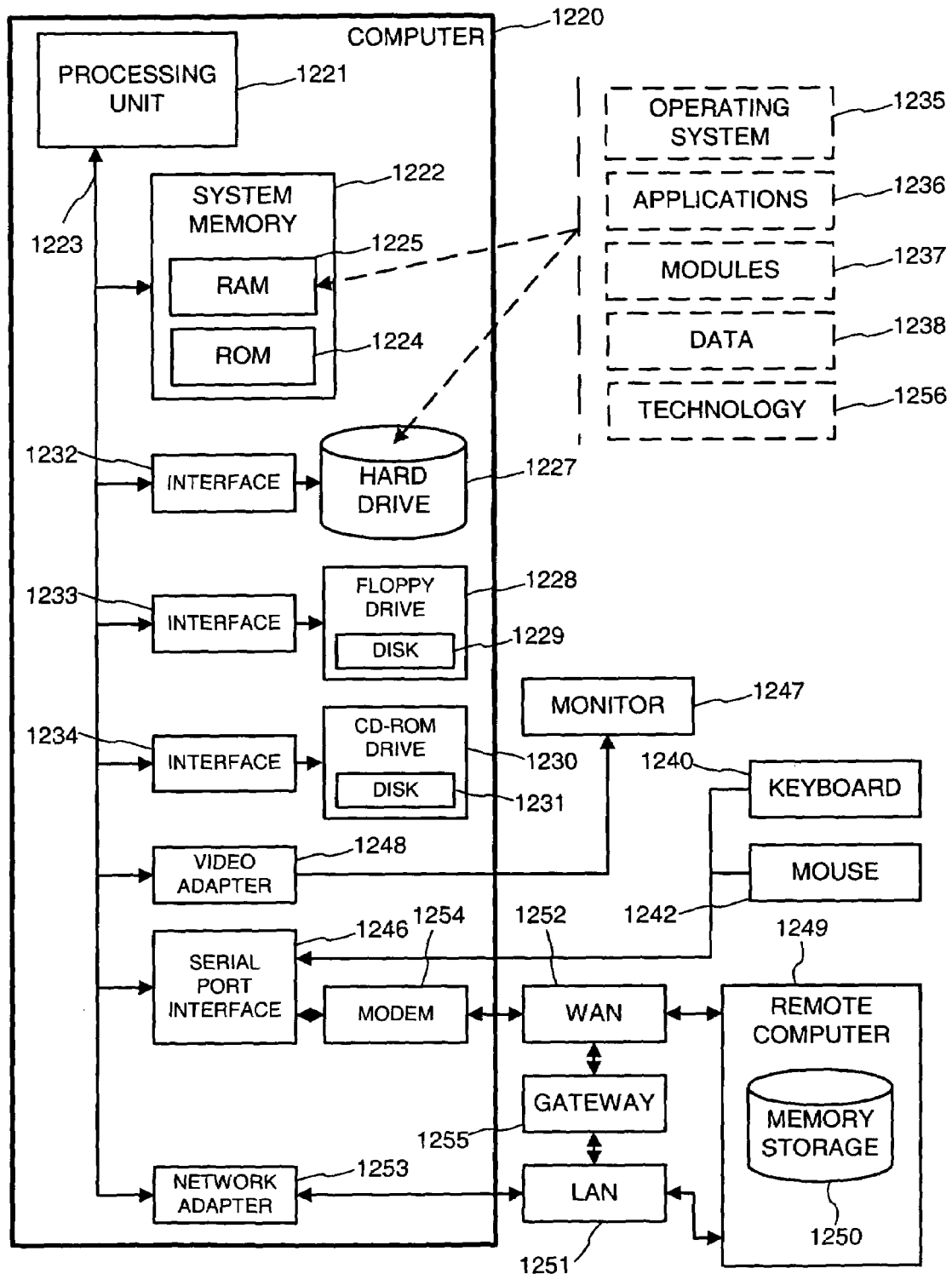

US 7,584,463 B2

STATE AS A FIRST-CLASS CITIZEN OF AN IMPERATIVE LANGUAGE

FIELD OF INVENTION

The technology relates generally to determining variable states of an executing program, and more particularly to saving program state for later reflection or recall.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

Modem imperative languages have powerful capabilities for reflection which make language elements like types, methods and fields accessible to program developers as first class citizens. Debuggers provide a way to freeze an executing program and examine selected variables at a frozen state. Test developers often introduce write statements into programs under test in order to determine whether write statement outputs reflect expected outputs. In transaction processing, the old value of each changed variable was individually saved when a transaction was declared. This data was then available to write back into the program to return to the pre-transaction state in case of a rollback.

SUMMARY

The described technologies provide methods and systems for saving state, accessing state, and reinstating a prior saved states via semantically accessible programming constructs.

One example of the technology provides an application programming interface for creating a state component that saves the present state of a program or model. As the state of the program evolves, the saved state(s) remains in case it is required later. Using a state reference token, the saved state of the program or model can be accessed, or the program or model can be returned to the saved state. After returning to the saved state, a second execution path can be introduced without requiring re-execution of the actions leading to the saved state.

In another example, the technology provides a way to save a present state for rollback if required in exception processing or transaction processing.

In another example, the state space of an executing model is saved in order to generate input conditions required to exercise a program.

In another example, a state component is dynamically linked to an executing program. In another example, a model is run in parallel with a program, and states of the model are saved and recalled in order to determine whether the program follows an expected behavior of the model.

Additional features and advantages will be apparent from the detailed description, which proceeds with reference to the accompanying drawings.

BRIEF DESCRIPTION OF THE DRAWINGS

FIG. 10 is a program listing of exemplary methods of a state class.

FIG. 12 is a block diagram of a distributed computer system implementing the described technologies.

DETAILED DESCRIPTION

Figure 1:
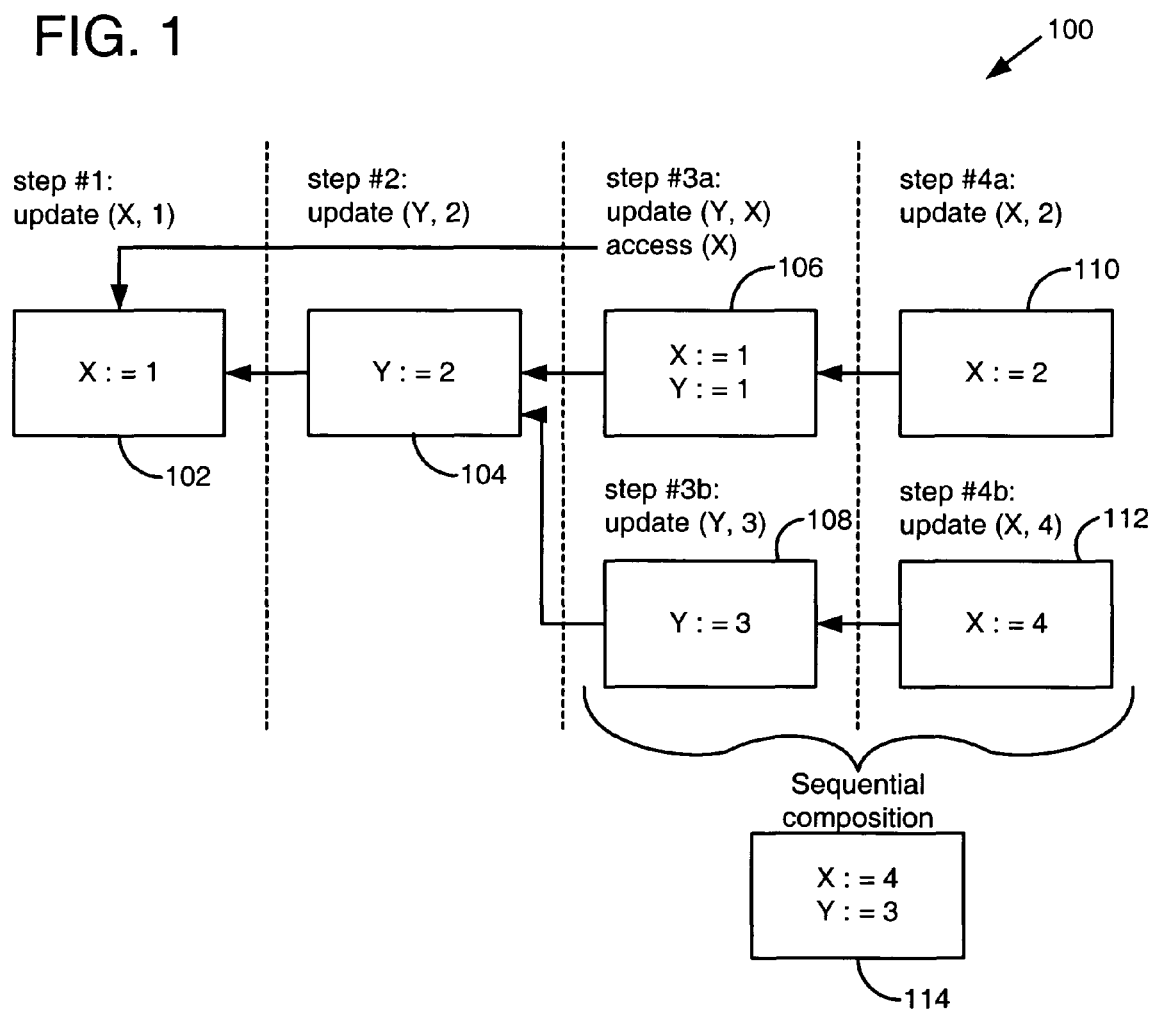
FIG. 1 is a diagram of an exemplary data structure used by a state component to store a copy of state of a program or model.

Software testing represents a significant portion of development costs. In addition to other benefits, the described technology provides a method of analyzing program behavior that adds state of a program as a first class citizen in addition to existing first class language elements such as types, methods, and fields. By using state as a first class language construct, a programmer can return to a saved state and explore other exit paths (or actions) from a saved state. For example, in one case, many execution paths of a model program for test case generation are tried.

Some modem imperative languages have powerful capabilities for reflection which makes reflection of language elements like types, methods, and fields, available as first-class citizens. First-class citizenship allows generic algorithms over such entities. However, they lack the capability of dealing with the state of a program as a first-class citizen. State as a first-class citizen is important to analyze a program behavior, for example, exhaustively trying all execution paths of a model program for test case generation.

Analyzing programs and models, in particular for systematic testing, is of importance for obtaining trustworthy software. Depending on the application, more than 50% of the development costs are required for testing. Improving the testing process can gain significant competitive advantage.

An imperative program or a program model is a sequence of (possibly simultaneous) updates on state variables. In any step of the program, the current value of a variable is that of the most recent update looking backwards in the sequence. In a state frame, the state component calculates updates based on the current values of the variables. Making state first class in this setting, amounts to obtaining references to positions in the sequence backward from the current point of execution, and allowing a program execution to continue from a prior saved state, with an alternative sequence of further updates.

A state component represents update sets as frames holding the updates created in the current step linking backwards to frames of earlier updates. When a value for a particular variable is retrieved in the current state, the frames are walked backwards until an update for that variable is found. To speed-up further accesses on the same variable, a cache of the values of variables can be established. In one example, this cache can be realized by copying an update to the present frame from a prior frame when an access occurs. Thus, the next time the same variable is accessed, a walk backwards will only be necessary until the frame is reached where either the variable has been originally updated or has been last accessed.

Notice that there are at least two states being discussed here. A first state is an evolving present state of a program or model. It is the evolving state of a program or model that is defined or referenced as a first class citizen via an imperative program construct or paradigm. Once this program model or state is defined and referenced, it is saved in a data structure and can be accessed as a first class citizen from the program or model. The data structure comprising the saved state, or series of saved states of a program or model, is the second state saved in a state component (i.e., a state process/thread, state model or state mechanism in this document); and includes the data and methods used to support state as a first class citizen.

One example of a state component supports dealing with sequential and parallel composition of imperative programs, features which support high-level modeling languages such as Abstract State Machine Language (ASML). On sequential composition, a sequence of frames can be collapsed into one frame. In that case, the sequence of frames is merged into a single frame, which contains the most recent updates of variables. In another example, supporting parallel execution, a parallel frame contains a link pointing to a frame it is in parallel with. On composition, parallel frames are merged building the union of updates of both frame chains while checking for racing conditions on updates on variables.

FIG. 1 shows an exemplary evolution 100 of updates as represented by frames. In step #1, variable X is updated 102 with the value 1. In step #2, variable Y is updated 104 with the value 2. In step #3a, variable Y is updated 106 with the value of X. To obtain the value of X for the update, frames are walked back to step #1. As a side benefit of accessing X, the X value is copied to the frame of step #3a, in case it is needed again. In step #4a, X is updated with the value 2. At step #4a, X is 2, and Y is 1. In this example, it is desirable to examine another execution path or action from step #2, so the state is set back to step #2, and another execution path is forked (#3b and #4b) from the state of step #2. Step #3b updates Y with 3, and step #4b updates X with 4. After these updates, the value of X is 4, and the value of Y is 3. A sequential composition of steps 3b and 4b is merged into one frame 114.

Reflection is one way to obtain information about program components. For example, using reflection, information about a program can be obtained such as its types, methods, and their properties. In one case, reflection can retrieve current values of variables of a program. However, present systems provide no method to reflect over partial or entire saved states of an evolving program, or return a program to a prior state using a semantically accessible state binding. By creating a first-class state instance, a program state is saved and a programmer can reflect over the program using a token referring to a saved state.

The current state of a program is defined and saved as a first-class state instance. The state component stores the present state of a program. And then, as the state changes, the state component allows the programmer to refer back to the state variables in prior states or reset the entire program to a prior saved state. Thus, a state component provides a way to reflect over the state of the program, or to return to a prior state and execute over different passes of the program in different states. This allows exploring the behavior of the program, for example, in test case generation or transactions processing.

The technology is not limited to any testing language, e.g. Abstract State Machine Language (ASML), but is available as a construct of any programming language or as a component in a shared library that any programmer could use in a programming framework language (e.g., .NET, Windows, etc.) to incorporate state as a first-class citizen into an application. Thus, any programming language could incorporate this feature via an interface to a dynamic link library, or implement the feature directly into a programming language as a language construct.

For example, Table 1 shows a series of instructions in a transaction processing scenario.

TABLE 1

```
#include state.h
State s = capture_state( );
try {
   op1 ( );
   op2 ( );
   op3 ( );
} on error {
   set_state(s);
}
```

In such a case, the state component is part of the runtime, e.g., common language runtime (CLR), and is available to other components desiring to utilize state as a first-class citizen.

Table 1 includes three operations op1( ), op2( ), and op3( ) that should be executed automatically (e.g., a transaction processing scenario). Thus, no changes should remain unless all three can be completed successfully. If any of the steps cannot be completed, a failure occurs, and the state should be rolled back as if none of the operations had ever been started. Thus, a copy of the state is saved by capture_state( ) before any operation is conducted, and that saved copy is used to restore the program in the event of a transaction rollback by the operation set_state(s).

Here, conceptually with state as a first class citizen, the state of the program is copied by capture_state( ). In one example, if the program includes a database, it is copied along with variables and other state required to return to the moment the state was saved. In one example, the saved state includes IP, CALL STACK, REGISTERS, HEAP, etc. The saved state can be modified, for example by setting the instruction pointer (IP) to a different address, so that when the saved state is restored the program execution will continue at a different point. In another example, only the REGISTERS and the HEAP are saved.

So without knowing the details of the state of the program, the component user may save or recall all the potential variables at that moment in time, since a request to save the state of the program saves all this information. Additionally, the user requesting the state save can use this feature without calling out or defining which variables to save.

Rather, a programmer uses a function of the state component, capture_state( ) in this example, to requests a save at that point in time and the program declaring the state component is saved (e.g., "STATE s=capture_state( )" implies state save). Because of the potential resources required to save the entire state of a program, methods and systems for improving the efficiency are discussed herein. The potential amount of saved information or data could be prohibitive for efficient use, so other methods are introduced for efficiency purposes.

But semantically, these efficiencies would still have the effect of saving the entire state. Thus, transparent to the application programmer and without naming or individually identifying state, the state component saves the state of the variables.

For example, a transaction class relying on a state component, does not have to know about the individual variables and state of a program. Independent of knowing state, a program or component saves the state of the program using a function of the state component (or a programming mechanism), and then later reads or restores the state if necessary.

Prior to this technology, in transaction processing, each old value of a changed variable was individually saved when a transaction was declared. This data was then available to write back into the program to return to the pre-transaction state in case of a rollback.

Later in Table 6, a class transaction is defined based on a state application programming interface (API). Using the state API, a transaction class creates a transaction, defines a rollback point, and makes a copy of state. The transaction has a commit ( ), and a rollback ( ) function. The commit ( ) means leave the state changes alone, whereas the rollback( ) restores to the pre-transaction state using the rollback ( ) function, which calls the set function on the state class shown later in Table 4.

A state object (or function) is implemented as a feature of ASML, or added as a language construct to any programming language, or it can be a class introduced into a class library for integration into any programming language. Further, the concept can be added to the overall framework (e.g., CLR), or java runtime. Further, the component can be integrated into the system of any computer, so it can be called through its API by any language or other program, as part of the runtime library, and/or dynamically linked as needed. In one sense, being a first-class citizen means being semantically accessible by a program or modeling language. An instantiated state mechanism or object is given a name that can be referred to in a program. For example, in Table 2, the state object "s" is created, and then later, possibly used in some error condition test to reset the program to the state at the time "s" was declared. In this example, "State.Fork( )" saves the state in "s", and "s.set ( )" returns the program to the state saved at "s".

TABLE 2

State s = State.Fork ( );
X = 3
Y = X + 2
X = X + Y
*
*
*
s.set ( );

With previous rollback techniques, a set of values would have to be explicitly identified and written to a log so they could later be restored by systematically unwinding or rolling back one at a time.

Figure 2:
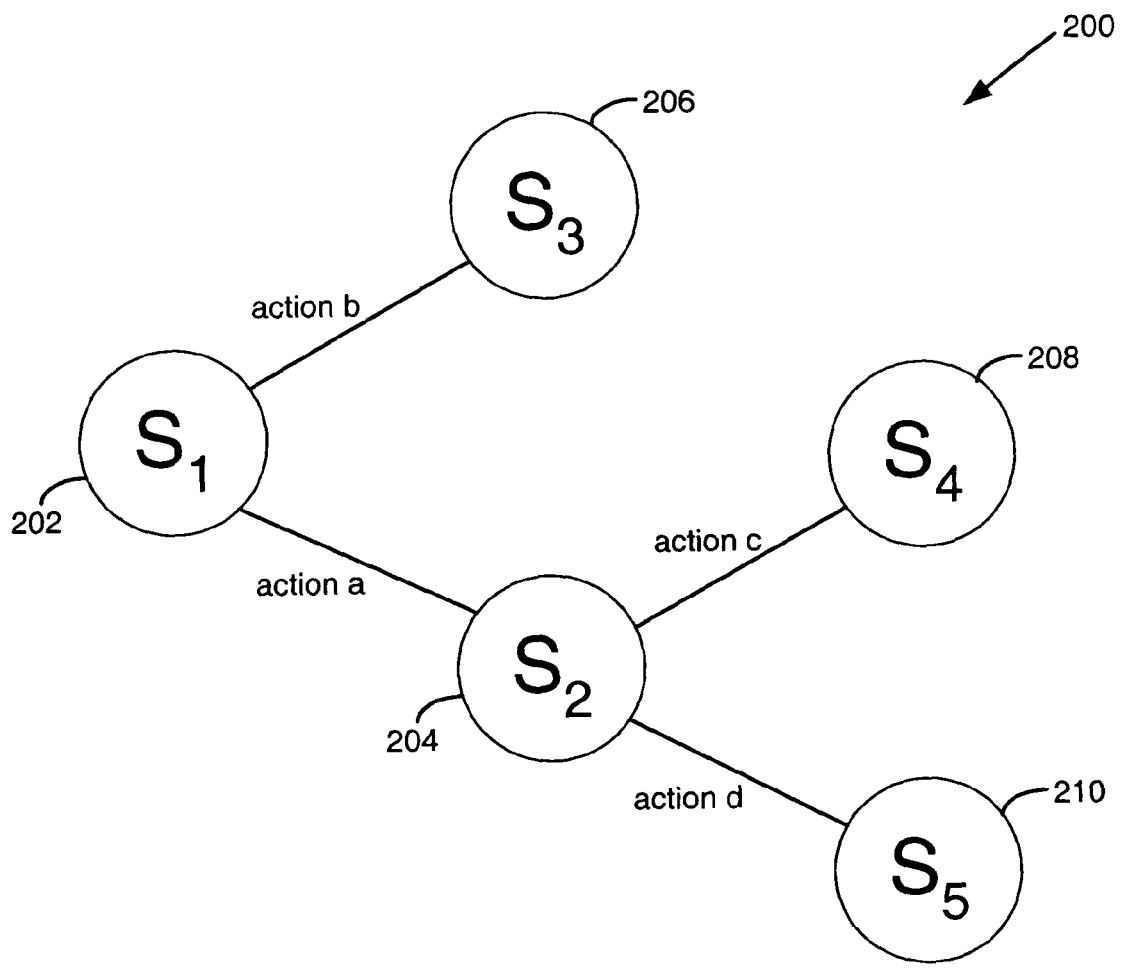
FIG. 2 is a diagram of an exemplary tree data structure representing saved states.

As shown in FIG. 2, a tree 200 of saved states of a test model or program can be created using state as first class citizen. The tree represents saved state spaces of a program. A state is set $S_1$, 202, and an action is taken "action a" to arrive at another state $S_2$ 204, and then state can be reset to $S_1$, 202, and then another action is taken "action b", to arrive at state $S_3$ 206. Once actions from state $S_1$ are complete, the state can be returned to $S_2$ 204, where another action is taken "action c" to arrive at state $S_4$ 208. Once state $S_4$ is determined, state is returned to state $S_2$ in order to determine the affects of "action d", which causes $S_5$ 210.

In this way, by using state as a first class citizen to examine a program state space, testing paths, or test cases, a program developer can elegantly return to a prior state space and introduce a new action on that state. It is desirable to examine and exercise the state space of a program under test. State as a first class citizen allows this to be done elegantly, without requiring a tester to record or individually save variables in the state space of the program.

Additionally, a state object can be used to generate tests for a program. For example, a model of a program can be generated in a modeling language such as ASML, C#, or others. By modeling, the program behavior is observed and test data is created.

For example, in FIG. 2, using a model represented by the tree 200, a set of actions would be developed as shown in Table 3.

TABLE 3

| Test # | Actions |
| --- | --- |
| 1 | action a |
| 2 | action b |
| 3 | action a, c |
| 4 | action a, d |

Programmatically, while in state $S_1$, the state is saved in a semantic programming construct (e.g., State $S_1$=State.save ( )), and later when performing test 3 and 4, state is reset to $S_1$ (e.g., $S_1$ .reset ( )). Then another set of actions are taken (e.g., Test 3, action a, c), in order to explore the Test 3 state space (e.g., $S_1$, $S_2$, $S_5$). In this example, a model is used to develop a state space to run on an actual program, so the action sequences of Table 3 are subsequently run on a real program. So the state object is used in this case to return to states in the model. An example program of how to generate inputs for testing is described in Barnett et al., "Conformance Execution of Non-Deterministic Specifications for Components," filed Feb. 20, 2002, U.S. patent application Ser. No. 10/081,329.

Figure 3:
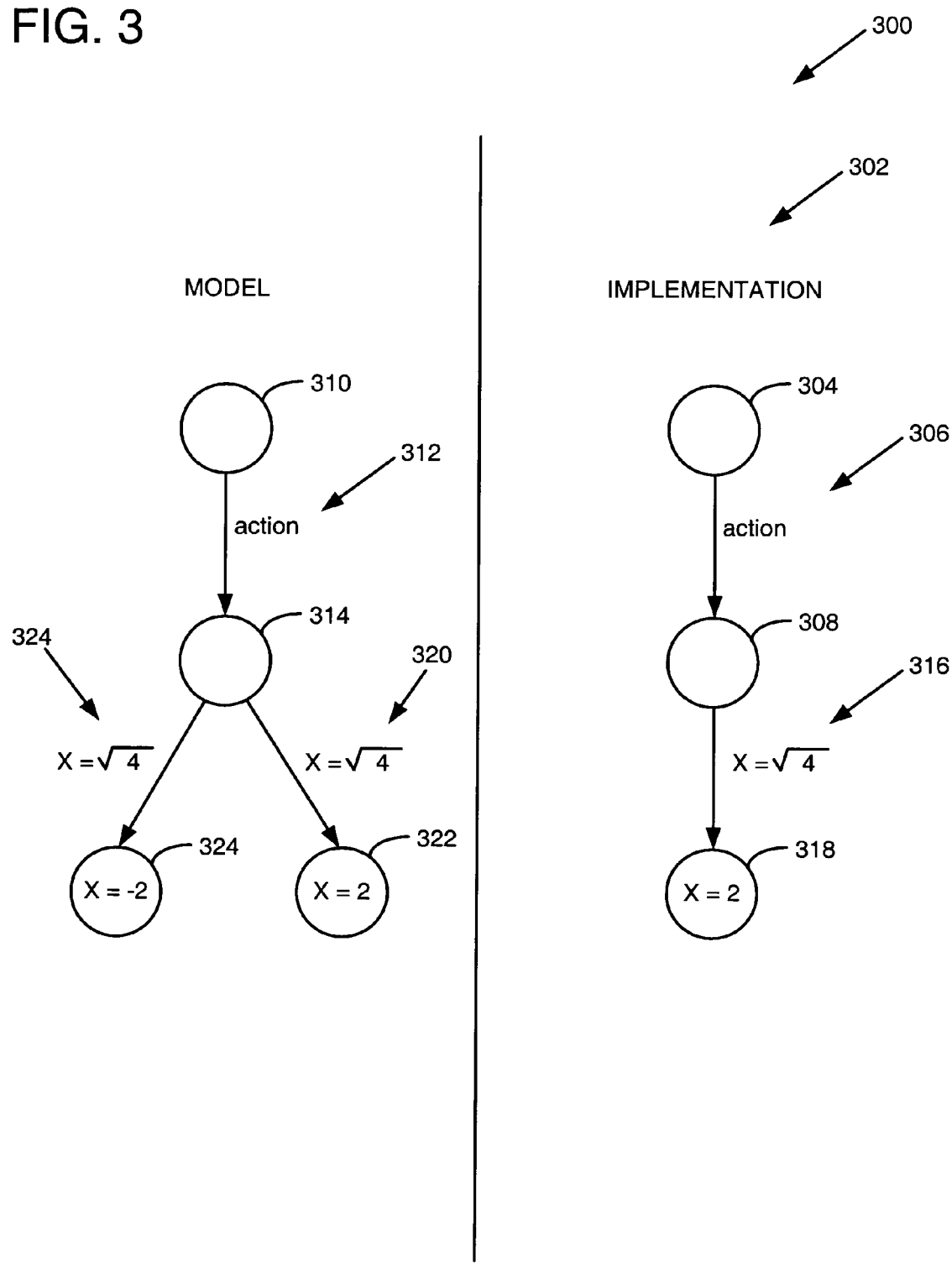
FIG. 3 is a diagram of an exemplary test model running in parallel with a program.

Another use for a state component is in the development of non-deterministic models. For example, as shown in FIG. 3, a model and an implementation are run in parallel 300. In one case, the model is a specification indicating how the implementation should perform. The implementation has a state 304, and an action 306 causing a transition to a new state 308. Thus, the model has a model state 310, a model action causing a transition 312, and a resulting new modeled state 314.

In this example, an action 316 in the implementation takes the square root of 4, and the new state 318 includes a variable X=2.

Thus, the model includes a state 314, action 320 and state 322 specifying the desired behavior. In this case, the model is smarter than the implementation because it specifies an additional resulting state 324 for the same behavior 324.

In this example, the model is running in parallel with the implementation, and if the model arrives at a state 324 (i.e., X=−2) contrary to the implementation result 318 (i.e., X=2), then before the model determines that the implementation state result is wrong, the model returns to the previous state and tries another action 320 in order to determine if the implementation has arrived at another specified model state 322.

Conceptually, in order to preserve states for roll back, a copy of all the data that is in the programs running system is needed. This copy is called the "bindings" and it contains all the assignments of the variables. Optionally, timestamps can be introduced into saved states to show relative time of binding updates.

In an exemplary state class, a variable called bindings holds all of the variables related to the program or model that implements the state class. Additionally, an exemplary state class has a variable called origin which is a timestamp. Suppose in a program or model it is desirable to do some form of parallel paths of processing. This is useful, for example, to model state for two threads or to distinguish state for two paths of execution changing program state in divergent ways.

Figure 4:
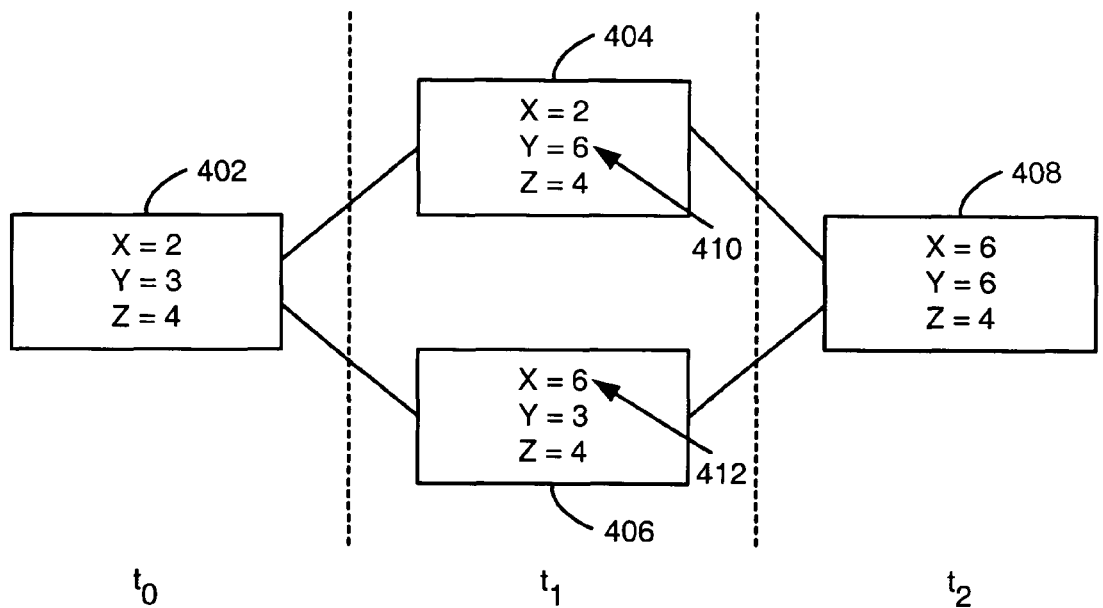
FIG. 4 is a diagram of an exemplary data structure used by a state component to store a copy of the state of a program or model.

As shown in FIG. 4, a frame 402 is created at time $t_0$ to hold a copy of the variables of the program at a given moment. At time $t_1$, parallel processing or other divergent paths record state changes 404, 406 that occur after that moment. Thus, at 402, the program state is saved in a data structure (e.g., a state frame), changes made by a first thread are stored in frame 404, and changes made by a second thread are stored in frame 406.

A method of a state object allows a programmer to "fork" the execution path, whether as a thread or other divergent path through a program that may cause alternative data variable updates. In this example, every variable accessible by the program is saved in a frame 402, and carried forward into a forked copy of the frame 404. In this example, while following the divergent path, the Y variable in the new frame 404 is updated according to the executed instructions in the divergent path (e.g., Y is set to "6" 410).

As shown, another frame 406 is used to represent data when the fork is not taken through a divergent path. In the unforked path 406, the X variable is updated (e.g., X is set to be "6" 412).

It is desirable in some cases to converge two diverged paths back into a single frame. For example, if the two divergent frames represented state changes made by two different threads to a database (e.g., travel agents making changes to airline database), then it is desirable to determine whether the state changes are consistent, so that they can be merged back into one frame 408 representing the state of the single database. In this example, since one thread or process 404 changed different state data than the other 406, a combined or integrated frame can represent changes made to the database by both agents 408. Thus, the frames would contain the evolving state changes to both X and Y. This form of combining parallel frames 404, 406 that include consistent changes is called parallel composition. In this example, each frame 402, 404, 406, 408 includes a copy of the universe of variables. Next, an example of how to reduce the information in each frame is discussed.

When a fork is to an agent running under another processor clock, the agents running according to separate clocks can evolve completely independently, and then joined again later in parallel composition. For timestamps assigned by separate clocks, the parallel composition can be conducted so long as no unresolvable value conflicts occur (e.g., two distributed agents assign different values to same variable).

Figure 5:
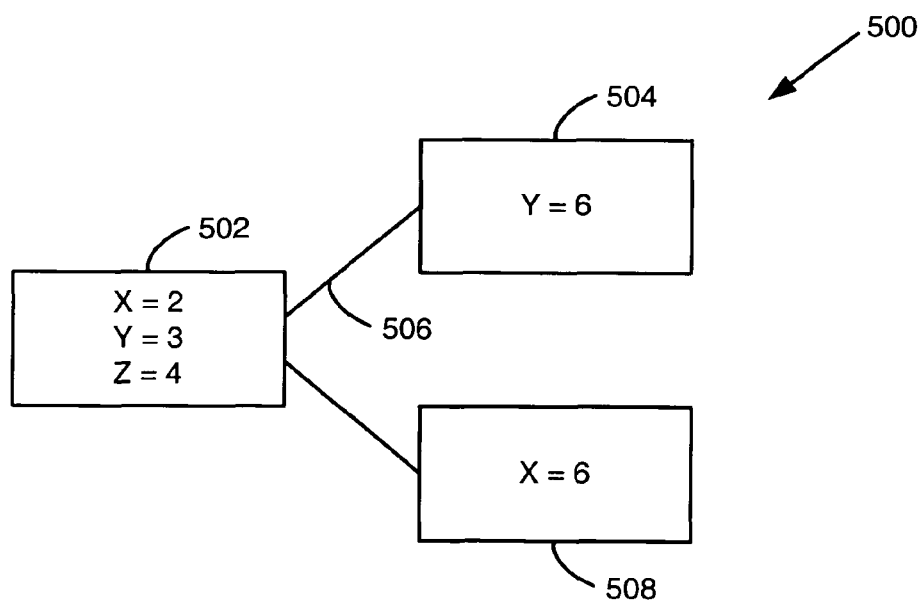
FIG. 5 is a diagram of an exemplary data structure used by a state component to store a copy of state of a program or model.

FIG. 5 illustrates a method for reducing the amount of data recorded in a frame. For example, one frame 502 stores the saved state universe. This can be done when a state object is first created and possibly also at other times throughout the program or processing. However, at other times during processing, for example, upon a save or fork path request, a frame is created 504 that contains only updates made (e.g., changing Y to value 6) to the previous frame 502. In such a case, it is implicit in the structure that any variables not changed since the new frame was created can be accessed by following a pointer 506 back to the previous frame. Thus, the new frame 504 does not require a copy of the universe of variables or data since it is available by walking back the frame chain. As before, state changes made to the other divergent path are stored in the divergent frame 508.

Figure 6:
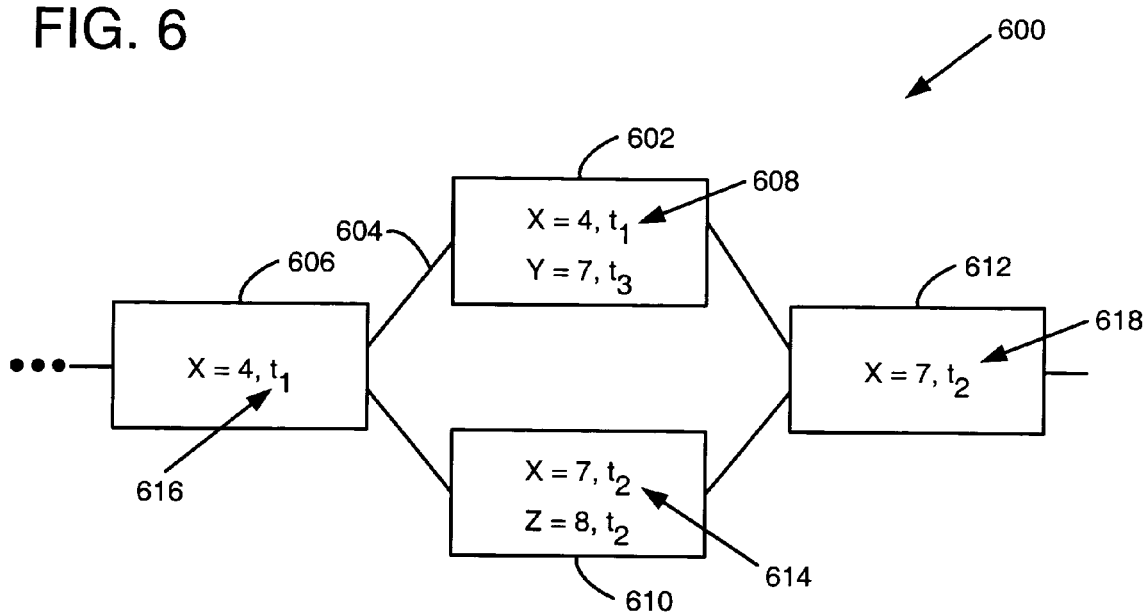
FIG. 6 is a diagram of an exemplary data structure used by a state component to store a copy of state of a program or model and includes timestamps.

As shown in FIG. 6, frames 600 or individual data updates within frames can include timestamps (e.g., $t_1, t_2, t_3, \ldots$). In some examples, timestamps can help resolve possibly competing updates made by plural agents, such as in parallel processing and other divergent execution paths where the relative timing of updates are relevant later for parallel composition.

In this example 600, a first agent forks and the state object creates a divergent frame 602 to save state for this path/thread. This first agent first does a read of variable X, and the read method of the state object walks a pointer 604 back to read the first frame containing the X variable.

In this case, the X variable was updated in the previous frame 606 at time $t_1$ (i.e., X=4, $t_1$). In this example, as an added efficiency, the read variable is copied into the current frame 608 so a next read will not have to walk back to read X again.

Next, a second agent creates a divergent path (e.g., forks) and then updates the X and Z variables, which are stored in the divergent path frame 610 with timestamp $t_2$. The state object walked back beyond the 606 frame to read the Z variable for the update. Finally, when the first agent updates the Y variable, the state object updates the corresponding frame 602, with the updated value for Y (i.e., Y=7, $t_3$), and assigns the timestamp value $t_3$. (Notice, if the first agent forked from the executing program, the second agent may not need to fork if it is a continuation of the executing program.)

Finally, when the agents return from separate execution, changes can be merged (i.e., parallel composition) back into a new frame 612 if desirable. In this case, the timestamps on the competing X value bindings are used to determine which value 608 or 614 to assign to X in the composed frame 612. Since it is know known that the t2 update happened after the t1 608, 616 update, the latest value of the X value 614 is carried forward 618 into the composed frame 612. Thus, timestamps are useful in some cases for parallel composition.

In general time evolves sequentially. So when events are recorded by a state object recording state changes made by one agent, then the steps are sequentially ordered and composition is straight forward. However, once a fork occurs, even if agents maintain independent local time (e.g., separate clocks), they often still include values set with relative original time. This concept is helpful in understanding relative time for local processes and/or threads versus distributed agents (e.g., distributed computing).

For example, if parallel frames 602, 610 represent agents running with relative deterministic timing (e.g., on a single computer), then the relative time of value updates 608, 614 are deterministic. However, if the parallel frames 602, 610 represent frames for agents that run non-determinable relative timing (e.g., agents running according to different time clocks), then the order of updates may not be deterministic. In this example 600, that does not matter since timestamp $t_1$ occurred before the fork. However, if time $t_1$ had occurred in the forked frame 608 (instead of the prior frame), then the parallel frames 602, 610 would be uncomposable in some cases because the last update of X is unknown.

Notice that parallel composition is not required for some uses discussed herein such as transaction processing and/or analyzing program behavior by exhaustively traversing or creating execution paths. In those examples, a state is saved before beginning a transaction or execution path, and the state is reset if the transaction aborts, or the execution path is reset to a prior state before trying another action from the reset state.

Figure 7:
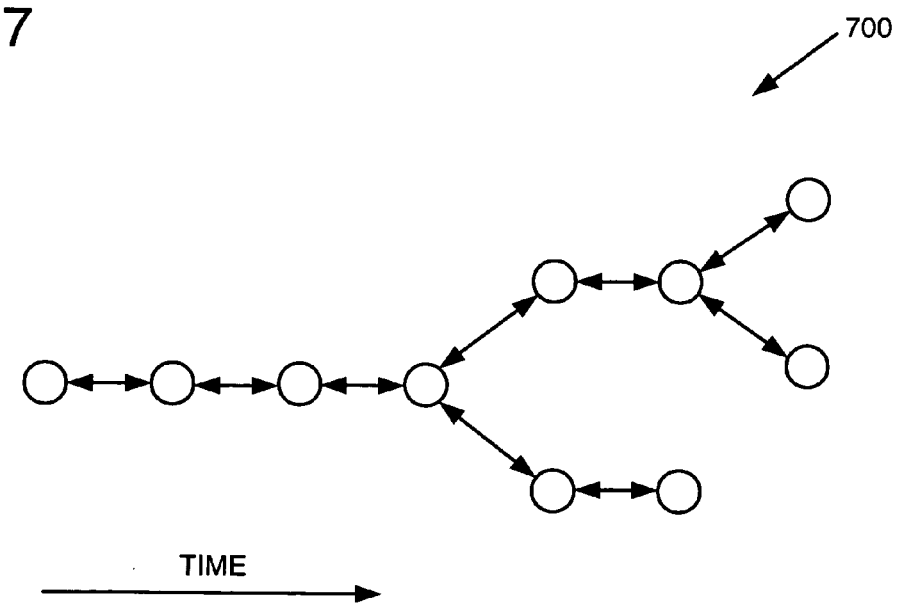
FIG. 7 is a diagram of an exemplary tree data structure representing relative time without timestamps.

As shown in FIG. 7, a tree data structure 700 is used to represent frames in relative order. In such a case, the tree data structure can also be used to represent relative time for timestamps. In such a case, relative time can be determined by the tree structure and actual timestamps are only optionally employed. Since the relationship of the tree maintains order, the actual timestamp can optionally be displayed to aid in human understanding. In this tree data structure, explicit timestamps are not required since the frames (i.e., the nodes of the tree), have edges (i.e., linked-lists, in this example double linked-lists) pointing to the frames that occurred before and after each frame. In such an implementation, timestamps are not required. As discussed, the backward links are used to obtain bindings to values that occurred earlier in time in the frame chain. However, the conceptual or actual implementation of time values can be valuable in representing relationships to humans.

Figure 8:
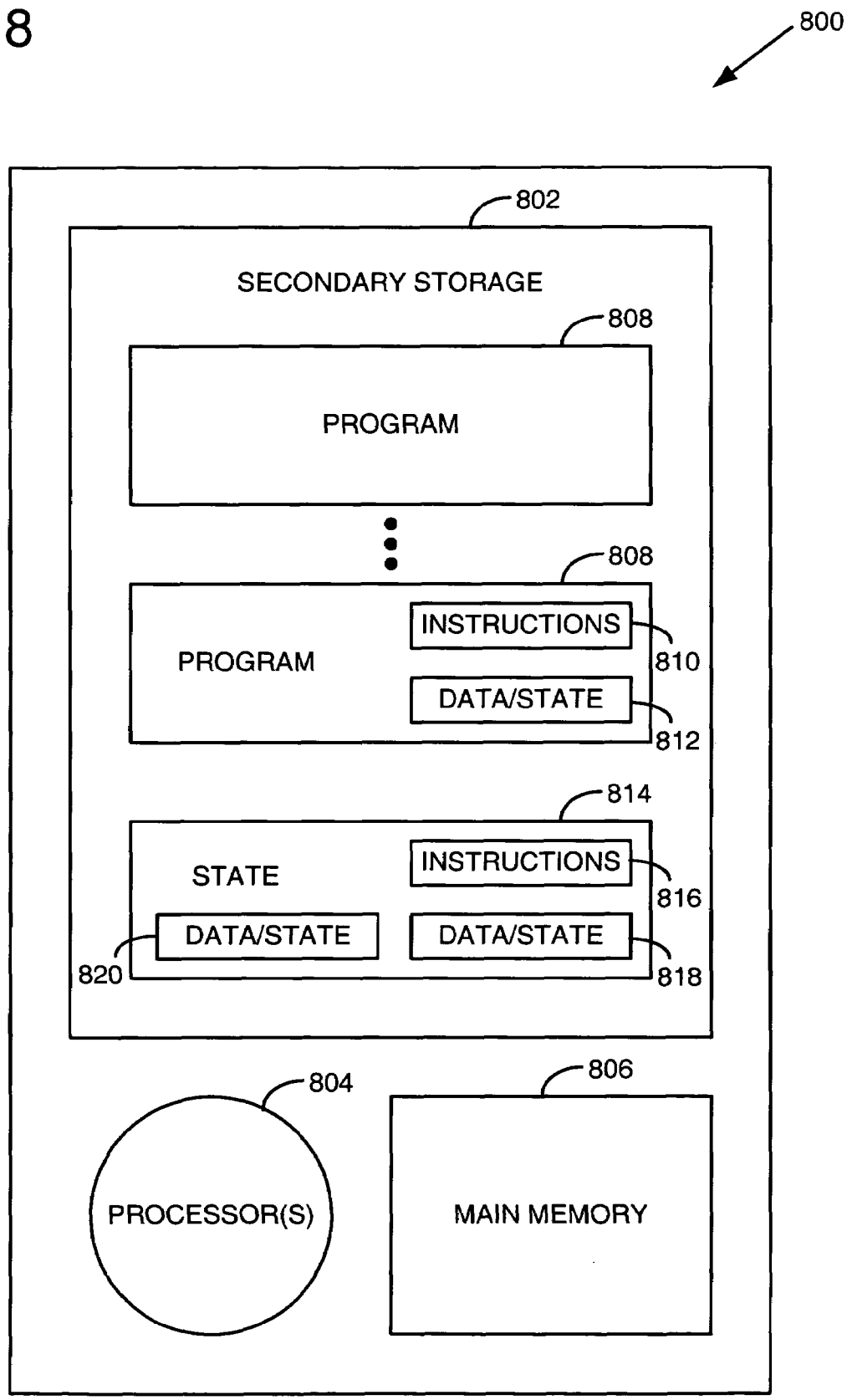
FIG. 8 is a diagram of an exemplary block diagram showing an overview of a system with a state component.

As shown in FIG. 8, a computer system 800 includes a hard drive 802, one or more processors 804, and main memory 806. The processor(s) 804 execute programs 808 which include instructions 810, and data and/or state 812. A state program or component 814 includes instructions 816, and data and/or state 818. In one example, a state program or component 814 is linked (e.g., dynamically linked) into another program or component 808 to save data or state 820 of the program or component 808. In another example, a state program or component 814 is a model or specification of another program 808 and is used to generate or specify expected states for the program or component. This would be useful, for example, in generating inputs that exercise the program or component for conformance testing. Additionally, this would be useful for generating expected outputs for testing the program or component 808. Whether generating inputs for testing or generating outputs for testing, the ability to mark and save status along the way saves time and resources since prior states can be reinstated. Once a state is reinstated, other paths or inputs can be taken from that state thereby examining the state space without starting at the program beginning.

Additionally, if a state component is integrated into a program or component, a prior state in the program can be reinstated without aborting work done by the program before the state was saved (e.g., before transaction processing commenced).

Figure 9:
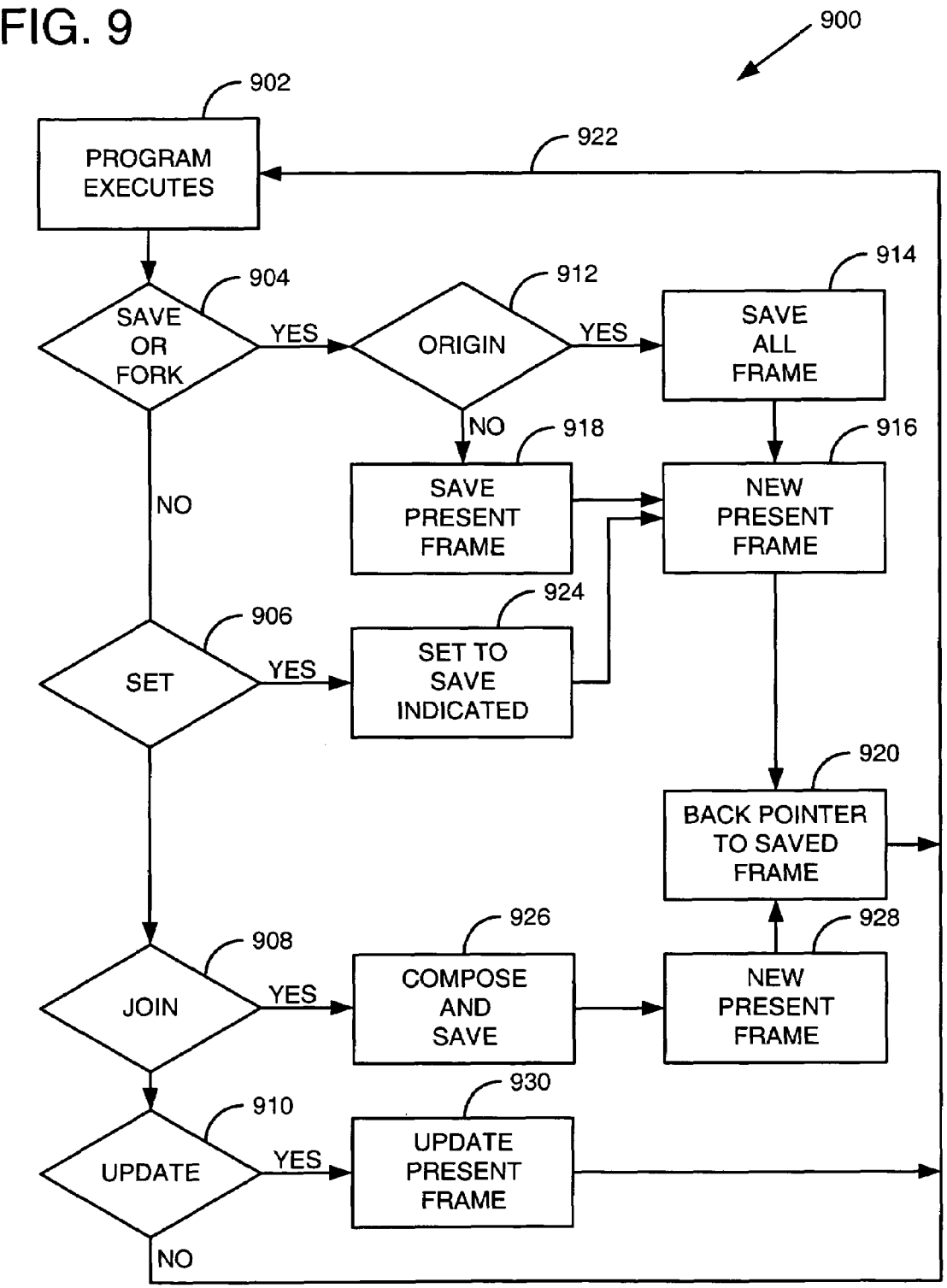
FIG. 9 is a flow chart of an exemplary method for saving and recalling state and managing state data frames of a state component.

FIG. 9 is a flow chart 900 for an exemplary method for a semantically accessible state mechanism or component.

At 902, a model or program is executing including program instructions and state.

At 904-910, an event causes an action by a state component. In one example, the program has made an application programming interface call on a state component. In another example, a programmer has included certain instructions in an application that causes a compiler to embed certain instructions in the binary code that invokes one of the events. Other scenarios could be used to cause the program to call an instruction or request a system service to perform events or services handled by a state component. However, the program itself has instructions and state, and the frames discussed in light of this method record a copy of the program state at certain times in a state component state frame, and other state frames record state changes occurring in the program in subsequent state frames. Additionally, updates made by the program to its own state are also recorded by the state component in present frames. Present frames containing only updates since a prior save, can themselves hold intermediate states when new save or fork events occur. In light of this example method, many variations of state frame saving chains will become readily apparent to those skilled in the art and are included in the scope and spirit of this technology.

While a program or model executes 902, a state save request is made 904. If the state save request is the first state save for this program execution (e.g., an origin state save) 912, the entire state of the executing program is saved 914, and a new present frame is created 916 to hold future updates to this saved frame. If an origin frame already exists, then a present frame is saved as the saved frame 918, and a new present frame is created 916 to save updates occurring by the executing program. Whether or not an origin save frame is created, the new present frame has a back pointer to the saved frame 920. As the program continues 922, the state changes of the program are stored as updates in the present frame 916.

At 904, the event is a fork request for parallel processing (e.g., distributed computing, multiple threads, etc.). The fork request is not an origin save request, so the existing present frame is saved in present form 918, and a new present frame 916 is created to save updates made by the forking agent/processor thread), and a pointer back to the prior state frame 920 is added to the present forked frame. Then execution returns to the program 922.

At 906, a state set request is received from the executing program. The state component sets the program state back to the identified set state 924, and then a new present frame is created 916 by the state component to receive updates made by the program after the state is set to the identified prior state.

At 908, a request to join frames is made by the program. The frames are composed (sequential/parallel), the composed frame is then saved 926, and then a new present frame is created 928 with a pointer back 920 to the two frames from which it was composed if parallel composition was performed, or back to a single frame 920 if sequential composition is performed on two adjacent sequential frames. As before, execution returns to the program 922.

During a state set request 906, if a request to set state is to a saved state after an origin state, then the origin state and the intermediate saved states leading to the requested set state are accessed (walked) to obtain the entire state information for the requested set state.

At 910, a variable or state update is made by the program to its own state. This generates an event that causes the state component to record a copy of the update in present state frame of the state component 930, before the program continues execution. Upon a next save or fork, the present frame contains these updates, and forms the basis for the next frame in the chain.

A save could be called every time a variable is changed, however, this is not efficient. Thus, so long as the present state is not a state that it will be desirable to return to, no save is necessary and the update is simply saved to the present frame. Further, if a save is requested, and later it is determined that the save is unnecessary since there is no need to return to the saved state (e.g., upon completion of a transaction after a commit), then sequential composition is used if it is then desirable to reduce the size of stored state information. In such a case, a join method is called on two frames, and they are sequentially composed into one frame.

In existing imperative programming paradigms, the state of the program is not a semantically accessible program object itself and cannot be reflected and dealt with programmatically without knowing its concrete structure.

Having program state as a first-class citizen and allowing programs to reflect over it has various benefits. For example, transactions are a software-engineering technique which allows grouping a sequence of operations into an atomic operation; if any of the constituting operations fails the entire transaction is rolled back, undoing possible state changes successful constituting operations did before the failure point. Transactions have been desirable as an integral part of recent programming frameworks like the one for .NET or J2EE. With state as first class citizen, powerful and easy to use transactional mechanisms are available as part of a framework library.

Additionally, analyzing program behavior by exhaustively trying all execution paths of a program for model checking or test case generation is more efficient with semantically accessible state objects. State as first-class citizen facilitates this search since it allows representing the frontier of possible programming states during a search. Thus, as the frontier is developed, a search returns to frontier states and explores other execution options without returning to start states.

In one example, state as a first class citizen is integrated into the ASML modeling language or into any programming language as an accessible programming construct.

Although the technology is not limited to any specific API for programming with state as an accessible construct, general concepts are better understood in the context of an example or two. Such examples would include being able to create a copy of the current program state, setting the current state to a previously created copy (essentially continuing execution with the exact state at the time the copy was created), and joining a copied state to the current state, thereby checking whether the states are consistent (two parallel states cannot both have updated a binding to different value at the same times).

An example API for this functionality is shown in Table 4.

TABLE 4

Class State // represents a state handle
   Fork ( ) // creates a copy of the current state
   Set ( ) // sets the current state to the one of this handle
   Join ( ) // joins the state of this handle to the current state For a programming language including a state component, updates on the program state will be done in the usual way according to the underlying programming language (by assignments to local variables or to fields). However, a compiler upon encountering a state object programming construct in the source code, will emit instructions that have the effect of recording state updates made to the program into a state frame of a state component or data structure. As shown in Table 5, exemplary compiler emitted instructions include an update and a read instruction. The actual location of the state (e.g., state frame) and the value of the update (e.g., data type, field, etc.) will vary based on the programming or modeling language using the technology. In this example, a read or update is of the present or current state. In order to read or update another state, first make that state the current state (i.e., "s.set ( )").

TABLE 5

Class state
   compilerinternal shared update (location as location, value as value)
   compilerinternal shared read (location as location) as value
type location
type value Table 6 is one example of how to implement transactions using an API as a regular framework component.

TABLE 6 class Transaction
   rollbackPoint as State // define rollback as state

TABLE 6-continued

Transaction ( )
   rollbackPoint := State.Fork( )
Commit ( )
   Skip // just do nothing
Rollback ( )
   rollbackPoint.Set ( ) // rollback to bindings set at state definition In another example, an API includes a temporal relationship of state changes with a time stamp. A timestamp identifies a position in a partial ordered domain of time. A state object can include an initial time, and can create new time stamps by the method "ForkTimestamp" as shown in Table 7. Given a timestamp t, ForkTimestamp produces two timestamps $t1$ and $t2$, such that $t1$ and $t2$ are incomparable (i.e., two independent branches), and $t<t1$ and $t<t2$ (i.e., $t1$ and $t2$ are later in time than t).

TABLE 7 class Timestamp
   GetInitialTime ( ) as Timestamp
   ForkTimestamp (t as Timestamp) as (Timestamp, Timestamp)
   Comparable (t1 as Timestamp, t2 as Timestamp) as Boolean //
      two different timelines are not comparable
   Less (t1 as Timestamp, t2 as Timestamp) as Boolean As discussed below, time stamps help argue about relative time of updates on variables when joining states. More specifically, if the states contain updates of a variable x at different times $t1$ and $t2$, then if $t1<t2$ (or $t2<t1$) one of the updates proceeds the other one and overwrites it. But if the time stamps are incomparable, then a race condition needs to be resolved.

An example state class including timestamps is shown in Table 8. The state class contains bindings and a timestamp. Updates of the current state will be associated with this origin timestamp, in relative order.

TABLE 8 class State
   var bindings as Bindings // of all "locations" that can have values
   var origin as Timestamp // t0

The bindings are a map of locations to their respective values and timestamps indicating their last update, as shown in Table 9. Each location represents a variable of the program.

TABLE 9 type Bindings = Map of Location to (Value, Timestamp)

There is one distinguished "current state," where states changes of the executing program apply to the current state. In one example, a current state is initialized by a state with no bindings and the initial time, as shown in Table 10.

TABLE 10

Var currentState as State = new State ({- >}), Get InitialTime ( ))

An exemplary state class includes a fork method that not only creates a copy of the current state, but it also advances the time of the current state and creates an independent time branch for the new copy using ForkTimestamp, as shown in Table 11.

TABLE 11

```
class state
    shared Fork ( ) as State// define rollback as state
        let (t1, t2) = ForkTimestamp (currentState.origin)
        currentState.origin : = t1
        return new State (currentState.bindings, t2)
```

Any state can be made the current state as shown in Table 12. There is always one "current state" so an executing agent implicitly refers to the state in which he is executing. And the agent running is any program that has included the state object within its program space and declared a state object.

TABLE 12

```
class state
    set ( )
        currentState := me
```

As shown at 1000 in FIG. 10, a state can be joined 1002 with the current state, thereby creating a new current state. If a location appears only in either of the two involved bindings 1002, its assignment is taken over into the resulting binding 1006. If a location appears in both 1008, a resolving mechanism is applied 1010.

As shown in the resolve method 1010, if a same location was updated by both of the two involved bindings, and the updates occurred in an order determinable by the timestamps, then the second update to the location 1012 is applied. However, if the updates occurred at temporally indeterminable times, then the conflicting updates are composed according to a method defined according to such factors as the data type and the program function. For example, for a certain program or data type a conflict can be defined by a data type or a user, or presented to a user for clarification upon an occurrence. Additionally, the bindings of the current state can be updated 1016, and the current value of a location can be read 1018.

The resource costs associated with saving the entire state of a program many times could become prohibitive. Thus, as an efficiency option, state frames are implemented at runtime as frames linked by back pointers. In that case, each frame only contains the updates that were applied in the corresponding state. This significantly minimizes the memory needed to represent a state and reduces the time needed to fork a state. When the current or present state is forked or saved, a complete copy of all bindings is not created. Instead, a new empty frame (i.e., new present frame) is created which has a back pointer to the previous state frame. The complete set of bindings of a state can be computed by following the back pointer of the frames. No time stamps are required, as the time tree is implicitly encoded in the tree structure induced by the back pointers 700. In one example, garbage collection of the runtime takes care of abandoned frames. In one example, if a frame can only be reached by exactly one back pointer, it can be merged with the frame from which the back pointer originates.

Thus, the current value of a location x does not need to be present in the frame of the current state, but it might be necessary to follow the back pointers to find the last update of x. In order to avoid this costly computation every time the current value is read, a cache of current values that have been read previously in is established. Whenever the size of this cache grows above a certain threshold, it is purged. or it can be purged partially as needed (e.g., last used overwritten first). For many applications, such a cache provides fast access to commonly used locations using a minimal memory footprint.

Figure 11:
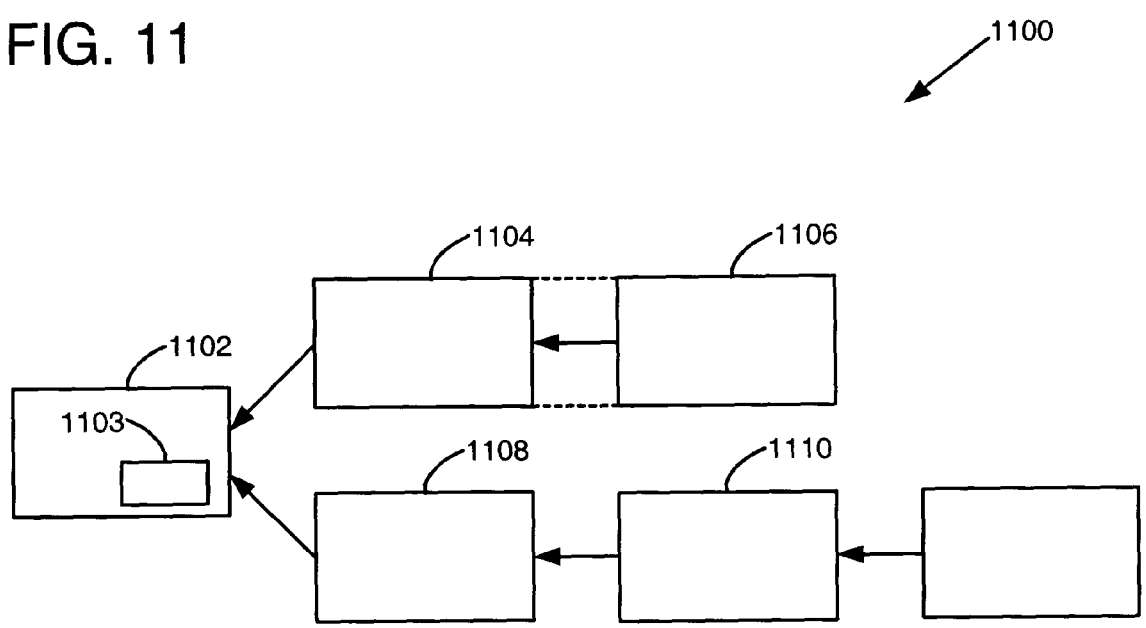
FIG. 11 is a diagram of an exemplary data structure used by a state component to discuss parallel or sequential frame composition.

As shown in FIG. 11, a frame data structure 1102 contains a reference pointer 1103 indicating how many frames point back to it (e.g., frame 1102 has reference count 2 because 1104 and 1108 point back to it). If there is one pointer pointing back to a frame 1104, and that prior frame is not an explicit state or fork frame, then an optimization is to sequentially compose the present frame with the prior frame (e.g., combine 1104 with 1106). Thus, if a frame has two frames that point back to it, then it represents a fork, and thus the current frame should not be composed with the prior forked frame.

As discussed with respect to FIG. 2, an explicit state frame is saved at $S_2$ so that it can be reset to that state in order to travel down several test paths (e.g., action c and action d). Thus, as shown in FIG. 11, when a frame 1102 includes two or more back points to it 1104, 1108, optionally, neither of the frames containing back pointers to that frame should compose content back into that prior frame 1102 since the other fork may later need to return to that state 1102.

Additionally, if a frame is an explicit state save frame 1108 (e.g., a transaction or other explicit state object origination), then that explicit frame 1108, optionally, should not be composed with a subsequent frame 1110, because a set action may later attempt to rollback to that state 1108 explicitly.

When two agents return from a fork, it may be desirable to determine whether their divergent resulting states can be composed into a consistent new state (e.g., 408). In cases where two agents attempt to update a variable to two different values, this may not be possible, and one of the agents work may need to be abandoned, if no other conflict resolution as defined by a state component user. However, in other cases based on the date type and operation conducted by the agents, parallel composition is desirable. For example, if a variable is a set of values, and two agents add members to the set, a composed frame would be the union of the set numbers.

Computing Environment

FIG. 12 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 12, an exemplary system for implementation includes a conventional computer 1220 (such as personal computers, laptops, servers, mainframes, and other variety computers) includes a processing unit 1221, a system memory 1222, and a system bus 1223 that couples various system components including the system memory to the processing unit 1221. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1221.

The system bus may be any of several types of bus structure including a memory bus or memory controller, a peripheral bus, and a local bus using any of a variety of conventional bus architectures such as Peripheral Component Interconnect (PCI), standards proposed by the Video Electronics Standards Association (VESA), Accelerated Graphics Port, also called Advanced Graphics Port (AGP), Microchannel, Industry Standard Architecture (ISA) and Extended Industry Standard Architecture (EISA), to name a few. The system memory includes read only memory (ROM) 1224 and random access memory (RAM) 1225. A basic input/output system (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions, etc. for the computer 1220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1225, including an operating system 1235, one or more application programs 1236, other program modules 1237, and program data 1238; in addition to this technology 1256.

A user may enter commands and information into the computer 1220 through a keyboard 1240 and pointing device, such as a mouse 1242. These and other input devices are often connected to the processing unit 1221 through a serial port interface 1246 that is coupled to the system bus, but may be connected by other interfaces, such as a parallel port, game port or a universal serial bus (USB). A monitor 1247 or other type of display device is also connected to the system bus 1223 via an interface, such as a video adapter 1248. In addition to the monitor, computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated. The logical connections depicted include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the computer 1220 typically includes a modem 1254 or other means for establishing communications (e.g., via the LAN 1251 and a gateway or proxy server 1255) over the wide area network 1252, such as the Internet. The modem 1254, which may be internal or external, is connected to the system bus 1223 via the serial port interface 1246. In a networked environment, program modules depicted relative to the computer 1220, or portions thereof, may be stored in the remote memory storage device. It will be appreciated that the network connections shown are exemplary and other means of establishing a communications link between the computers may be used.

ALTERNATIVES

Having described and illustrated the principles of our invention with reference to an illustrated examples, it will be recognized that the examples can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computer readable storage medium having stored thereon a data structure for saving state of an executing program a plurality of times as the executing program executes over time, the data structure comprising:
   a first state frame comprising a representation of a first state of the executing program;
   a second state frame comprising a representation of a second state of the executing program comprising state changes made by the executing program after the first state frame is created and the second state frame includes a pointer back to the first state frame; and
   a third state frame comprising a representation of state changes made by the executing program after a fork method creates the third state frame, and the third state frame includes a pointer back to the second state frame;
   wherein the representations of state form a chain of state frames;
   wherein a first state of the executing program is saved in the first state frame as a semantically accessible first state object, and a second state of the executing program is saved in the second state frame as a semantically accessible second state object;
   wherein the third state frame is empty when created by the fork method;
   wherein, after the fork method creates the third state frame, a value of a variable of the executing program can be accessed by checking, in backwards order that the state frames were created, for the value of the variable in the chain of state frames; and
   wherein at least one of the state frames in the chain of state frames comprises a cached value copied from a prior frame in the chain of state frames.

2. The computer readable storage medium of claim 1 further comprising a fourth state frame which includes changes made by the executing program after the fork method creates the third state frame and after a set method returns the executing program to a state indicated by the second state frame, and wherein the fourth state frame includes a pointer back to the second state frame.

3. The computer readable storage medium of claim 2 further comprising a joined state frame including a combination of state changes in the third and fourth state frames.

4. The computer readable storage medium of claim 2 wherein a first thread of the executing program makes state changes copied in the second state frame, and a second thread of the executing program makes state changes copied into the third state frame.

5. The computer readable storage medium of claim 2 wherein the data structure further comprises a fifth state frame with a pointer to the fourth state frame, wherein the fourth state frame further comprises a reference pointer with a value indicating how many frames point back to it, and wherein if the value of the reference pointer is one, then the executing program combines the fourth state frame with the fifth state frame.

6. The computer readable storage medium of claim 2 wherein the fourth state frame includes a pointer to the third state frame.

7. The computer readable storage medium of claim 1 wherein the second state frame includes unchanged state read from the first state frame.

8. A computerized method comprising:
via an application programming interface, receiving a request to create a state save;
in response to the request, at a first point in time, saving, by a computer, a first representation of a state of an executing program, wherein the saving comprises copying state of the executing program at the first point in time to a first state frame;
creating a blank state frame with a backward link to the first state frame as a first current state frame;
in the first current state frame, maintaining a representation of subsequent state comprising changes made to the state of the executing program after the first point in time;
via the application programming interface, receiving an other request to create a state save;
in response to the other request, at a second point in time, saving the first current state frame as a second state frame with a backward pointer to the first state frame;
creating an other blank state frame with a backward link to the second state frame as a subsequent current state frame, whereby a chain of state frames is generated;
in the subsequent current state frame, maintaining a representation of subsequent state comprising changes made to the state of the executing program after the second point in time;
in response to a request for a value of a variable after the request to create a state save, checking for the value of the variable, wherein the checking comprises walking backward through the chain of state frames from a last state frame toward the first state frame until an update to the value for the variable in the chain of state frames is found;
in response to the request for the value of the variable, returning the update to the value for the variable in the chain of state frames as the value of the variable; and
as a result of the request for the value of the variable, copying an update from a prior state frame to a current state frame, thereby speeding up further accesses to the variable.

9. The computerized method of claim 8 further comprising writing the value of the variable in a cache in the current state frame.

10. The computerized method of claim 9 further comprising;
when the cache is greater than a threshold size, purging the cache.

11. The computerized method of claim 9 further comprising:
when the cache is greater than a threshold size, overwriting a last used variable.

12. One or more computer-readable storage media having stored thereon computer-executable instructions for performing a method comprising:
receiving a request to create a state save;
in response to the request, at a first point in time, saving a first representation of a state of an executing program, wherein the saving comprises copying state of the executing program at the first point in time to a first state frame;
creating a blank state frame with a backward link to the first state frame as a first current state frame;
in the first current state frame, maintaining a representation of subsequent state comprising changes made to the state of the executing program after the first point in time;
receiving an other request to create a state save;
in response to the other request, at a second point in time, saving the first current state frame as a second state frame with a backward pointer to the first state frame;
creating an other blank state frame with a backward link to the second state frame as a subsequent current state frame, whereby a chain of state frames is generated;
in the subsequent current state frame, maintaining a representation of subsequent state comprising changes made to the state of the executing program after the second point in time;
in response to a request for a value of a variable after the request to create a state save, checking for the value of the variable, wherein the checking comprises walking backward through the chain of state frames from a last state frame toward the first state frame until an update to the value for the variable in the chain of state frames is found;
as the value of the variable, returning the update to the value for the variable in the chain of state frames; and
as a result of the request for the value of the variable, copying an update from a prior state frame to a current state frame, thereby speeding up further accesses to the variable.

13. The one or more computer-readable storage media of claim 12 wherein at least one state frame in the state frame chain comprises a timestamp identifying a position in a partial ordered domain of time.

14. The one or more computer-readable storage media of claim 13 wherein a fork method advances time of a current state and creates an independent time branch.

15. The one or more computer-readable storage media of claim 13 wherein the method further comprises:
joining a state with a current state.

16. The one or more computer-readable storage media of claim 13 wherein the method further comprises:
using the timestamp in a parallel composition.

17. A specialized computer apparatus comprising:

a processor;

memory readable by the processor and storing computer-executable instructions for performing a method comprising:

receiving a request to create a state save;

in response to the request, at a first point in time, saving a first representation of a state of an executing program, wherein the saving comprises copying state of the executing program at the first point in time to a first state frame;

creating a blank state frame with a backward link to the first state frame as a first current state frame;

in the first current state frame, maintaining a representation of subsequent state comprising changes made to the state of the executing program after the first point in time;

receiving an other request to create a state save;

in response to the other request, at a second point in time, saving the first current state frame as a second state frame with a backward pointer to the first state frame;

creating an other blank state frame with a backward link to the second state frame as a subsequent current state frame, whereby a chain of state frames is generated;

in the subsequent current state frame, maintaining a representation of subsequent state comprising changes made to the state of the executing program after the second point in time;

in response to a request for a value of a variable after the request to create a state save, checking for the value of the variable, wherein the checking comprises walking backward through the chain of state frames from a last state frame toward the first state frame until an update to the value for the variable in the chain of state frames is found;

as the value of the variable, returning the update to the value for the variable in the chain of state frames; and as a result of the request for the value of the variable, copying an update from a prior state frame to a current state frame, thereby speeding up further accesses to the variable;

wherein at least one state frame in the chain of state frames comprises a timestamp.

\* \* \* \* \*

UNITED STATES PATENT AND TRADEMARK OFFICE
CERTIFICATE OF CORRECTION

PATENT NO. : 7,584,463 B2 Page 1 of 1
APPLICATION NO. : 10/650245
DATED : September 1, 2009
INVENTOR(S) : Grieskamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Fourteenth Day of September, 2010

David J. Kappos
*Director of the United States Patent and Trademark Office*